(12) United States Patent
Patil et al.

(10) Patent No.: US 11,966,421 B2
(45) Date of Patent: Apr. 23, 2024

(54) SYSTEM, METHOD, AND COMPUTER PROGRAM FOR A CONTEXT-BASED DATA-DRIVEN CLASSIFIER

(71) Applicant: Yodlee, Inc., San Mateo, CA (US)

(72) Inventors: Deepak Patil, Bangalore (IN);
Karishma Dahal, Bangalore (IN);
Rushikesh Rathod, Mumbai (IN); Om D Deshmukh, Bangalore (IN); Vinay Manjunath, Bangalore (IN)

(73) Assignee: YODLEE, INC., San Mateo, CA (US)

( * ) Notice: Subject to any disclaimer, the term of this patent is extended or adjusted under 35 U.S.C. 154(b) by 0 days.

(21) Appl. No.: 17/863,276

(22) Filed: Jul. 12, 2022

(65) Prior Publication Data

US 2024/0020318 A1 Jan. 18, 2024

(51) Int. Cl.
*G06F 7/00* (2006.01)
*G06F 16/242* (2019.01)
*G06F 16/28* (2019.01)

(52) U.S. Cl.
CPC ........ *G06F 16/285* (2019.01); *G06F 16/2423* (2019.01)

(58) Field of Classification Search
CPC .......................... G06F 16/285; G06F 16/2423
USPC .................................................. 707/600–899
See application file for complete search history.

(56) References Cited

U.S. PATENT DOCUMENTS

| | | |
|---|---|---|
| 2003/0120481 A1 | 6/2003 | Murata et al. |
| 2011/0106734 A1 | 5/2011 | Boult et al. |
| 2012/0084238 A1 | 4/2012 | Kristal et al. |
| 2014/0304197 A1 | 10/2014 | Jaiswal et al. |
| 2021/0056404 A1* | 2/2021 | Goswami ................ G06F 18/22 |
| 2022/0382661 A1* | 12/2022 | Everman ............. G06F 18/2155 |

OTHER PUBLICATIONS

International Search Report and Written Opinion from PCT Application No. PCY/US 23/20737, dated Jul. 25, 2023, 6 pages.

* cited by examiner

*Primary Examiner* — Isaac M Woo
(74) *Attorney, Agent, or Firm* — Zilka-Kotab, P.C.

(57) ABSTRACT

As described herein, a system, method, and computer program are provided for context-based data-driven classification. Input to be processed using a classifier is identified. Data is obtained from one or more third party data sources, based on the input to be processed. The input is processed, using the classifier, to generate output that includes at least one classification for the input. Both the data from the one or more third party data sources and the output of the classifier are processed to determine a final classification for the input.

18 Claims, 5 Drawing Sheets

SYSTEM, METHOD, AND COMPUTER PROGRAM FOR A CONTEXT-BASED DATA-DRIVEN CLASSIFIER

FIELD OF THE INVENTION

The present invention relates to data-driven classification techniques.

BACKGROUND

Data-driven classification is a process by which certain data is classified using defined classifications (i.e. categories) by analyzing the data itself. It is commonly observed that the accuracy of data-driven classification techniques degrades over a period of time. One of the main reasons for this drop in performance is that the real-world context in which these classification systems are deployed changes and there are no systematic ways to continuously codify this changing context back into the original classification system. The most common way to recover from this performance degradation is to have human experts add rules that capture the context. However, this human intervention is inefficient and prone to errors.

There is thus a need for addressing these and/or other issues associated with the prior art.

SUMMARY

As described herein, a system, method, and computer program are provided for context-based data-driven classification. Input to be processed using a classifier is identified. Data is obtained from one or more third party data sources, based on the input to be processed. The input is processed, using the classifier, to generate output that includes at least one classification for the input. Both the data from the one or more third party data sources and the output of the classifier are processed to determine a final classification for the input.

DETAILED DESCRIPTION

Figure 1:
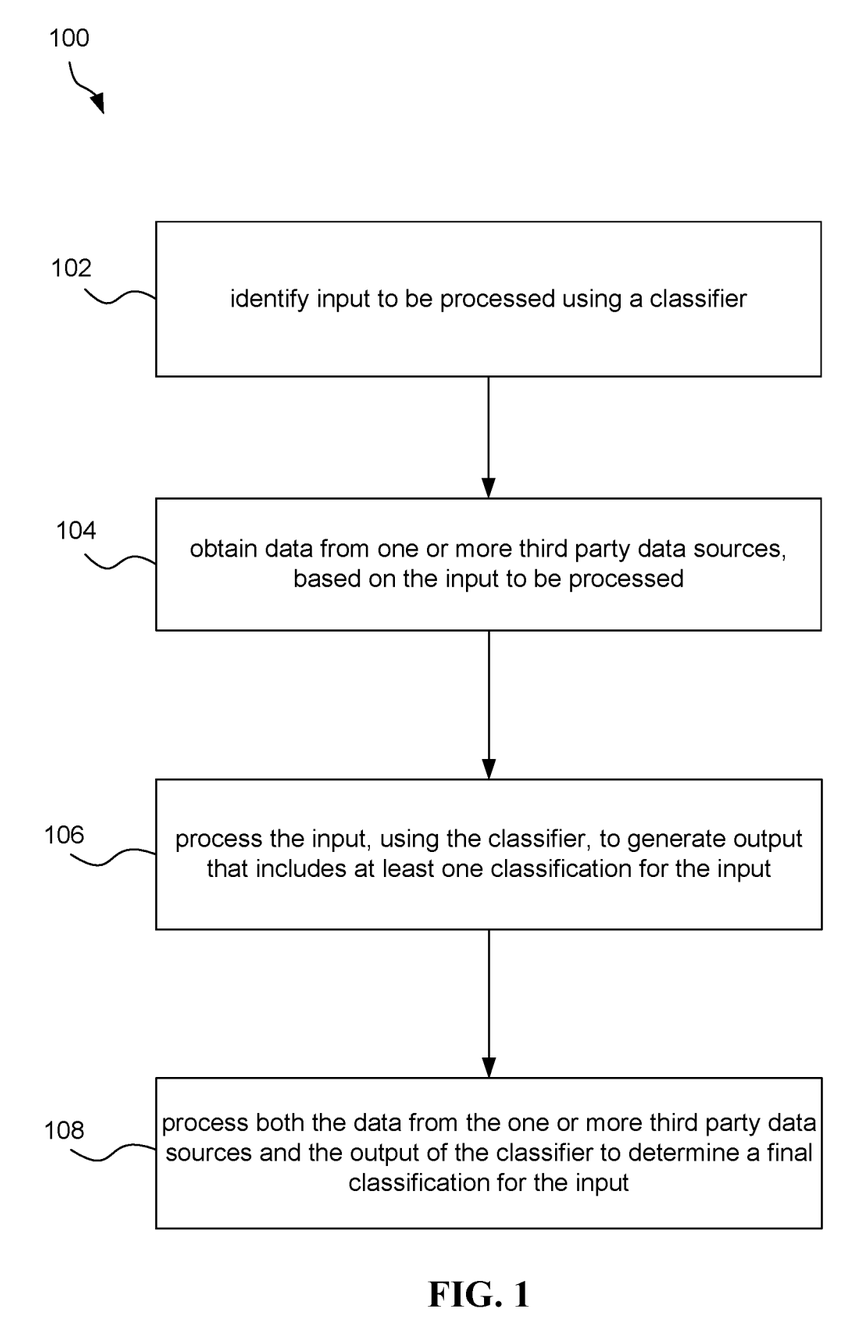
FIG. 1 illustrates a method for context-based data-driven classification, in accordance with one embodiment.

FIG. 1 illustrates a method for context-based data-driven classification, in accordance with one embodiment. The method 100 may be performed by any computer system, such as those described below with respect to FIGS. 3 and/or 4. For example, in one embodiment, the method 100 may be performed by a computer system that executes a classification engine to classify input or by another computer system that interfaces the computer system that executes the classification engine.

In operation 102, input to be processed using a classifier is identified. The input may be any data which is capable of being classified by the classifier. For example, the data may be of a particular format or type that the classifier is trained to classify.

With respect to the present description, the classifier is a type of machine learning algorithm used to assign a classification (i.e. a class label) to a given input. The classification may be selected from among a plurality of predefined classifications that the classifier has been trained to identify. In one embodiment, the classifier may be a machine learning model that has been trained to generate an output classification for the given input.

In another embodiment, an accuracy of the classifier may be assumed to have deteriorated from a time when the classifier was trained. This deterioration may be a result of the training data (used to train the classifier) being outdated. For example, the real-world context, in which the classifier was trained, may change over time.

Still yet, in one embodiment, identifying the input to be processed using the classifier may include identifying, from an input set (i.e. to be processed using the classifier), the input which is predicted to be incorrectly classified by the classifier. Thus, the input may be just a portion of the entire input set to be processed using the classifier, and in particular may be the portion that is predicted to be incorrectly classified by the classifier. This prediction may be made based on various characteristics of the input.

In one embodiment, the classifier has an overall prediction confidence, and wherein the input which is predicted to be incorrectly classified by the classifier may include samples from the input set that each have an output confidence below a certain threshold. In another embodiment, the input which is predicted to be incorrectly classified by the classifier may include samples from the input set that each have a description with at least one word not seen by training data used to train the classifier. In yet another embodiment, the input which is predicted to be incorrectly classified by the classifier may include samples from the input set that each have a description with at least one bigram or trigram not seen by training data used to train the classifier. In yet another embodiment, the input which has a particular word (seen or unseen) in a location which was not seen during the training phase (for example, if the word "atm" was seen only in the first and the second position in the training data, then if it shows up at the fifth position in a given sample), then that sample may be predicted to be incorrectly classified.

In operation 104, data is obtained from one or more third party data sources, based on the input to be processed. The third party data sources include any sources of data that is independent of the training data used to train the classifier. In one embodiment, the third party data sources may be one or more different Internet search engines.

It should be noted that the data may be obtained in any manner that is based on the input to be processed by the classifier, the reasons for which will be evident in the further description below. In one embodiment, the data may be obtained as a result of a query that has been formulated for use in searching the one or more third party data sources. For example, the query may be formulated based on the input, such as by modifying the input. As another example, the query may be formulated by determining a portion of the input that is a cause for predicting that the input will be incorrectly classified by the classifier, classifying the portion of the input using another classifier to generate a classification of the portion of the input, and formulating the query by inserting the portion of the input to a template (i.e. a query template) preconfigured for the classification of the portion of the input.

As an option, the data obtained from the one or more third party data sources may also be normalized. Normalizing the data may include processing the data to determine one or more portions of the data that provide an additional description (e.g. feature, etc.) of the input.

In operation 106, the input is processed, using the classifier, to generate output that includes at least one classification for the input. Thus, the input may be processed as-is, even though the classifier may have degraded over time and/or the even though input may be predicted to be incorrectly classified by the classifier.

In operation 108, both the data from the one or more third party data sources and the output of the classifier are processed to determine a final classification for the input. The data from the one or more third party data sources and the output of the classifier may be processed using any predefined function(s) that are configured to determine a final classification for the input based on the data and the output. Such final classification may be selected as one of: the data from the one or more third party data sources, and the output of the classifier. Optionally, the final classification may be selected as being neither the data from the one or more third party data sources, nor the output of the classifier.

In one embodiment, the processing to determine the final classification for the input may include processing features of the data from the one or more third party data sources and the output of the classifier, using a second machine learning (e.g. Random Forest) classifier, to determine the final classification for the input. The features may include an edit distance between each pair of: a portion of the input that is a cause for predicting that the input will be incorrectly classified by the classifier and the output of the classifier, the portion of the input and the data from the one or more third party data sources, and the output of the classifier and the data from the one or more third party data sources. The features may include a confidence of the classifier, and a confidence of the data from the one or more third party data sources.

To this end, the method 100 may be performed to provide a context-based data-driven classification, namely by considering a current context (i.e. the data from third party sources) for the input being classified. This may improve the accuracy of the existing data-driven classifier, which may have been trained on stale data, by allowing a current context associated with the input to be considered when determining a final classification for the input.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
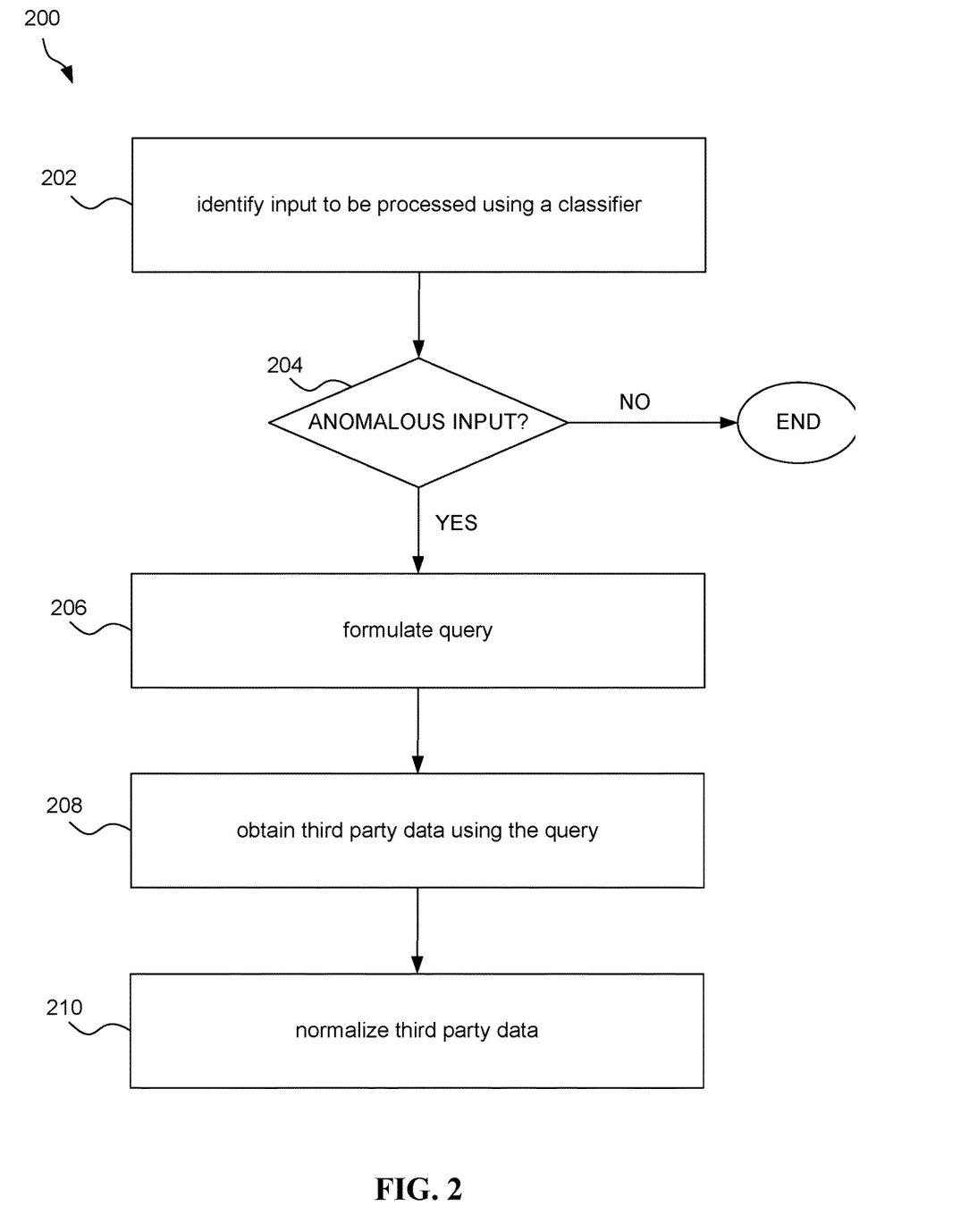
FIG. 2 illustrates a method for generating a context for input to be processed by a classifier, in accordance with one embodiment.

FIG. 2 illustrates a method for generating a context for input to be processed by a classifier, in accordance with one embodiment. As an option, the method 200 may be carried out in the context of the details of the previous figure and/or any subsequent figure(s). Of course, however, the method 200 may be carried out in the context of any desired environment. Further, the aforementioned definitions may equally apply to the description below.

In operation 202, input to be processed by a classifier is identified. The input may be a piece of input included in an input set to be processed by the classifier. Thus, the method 200 may be performed for each input in the input set.

In decision 204, it is determined whether the input is anomalous. An anomalous input refers to an input which is predicted to be likely incorrectly classified by the classifier or which otherwise has one or more anomalous features. If it is determined that the input is not anomalous, the method 100 ends for that input.

In one embodiment, the input may be anomalous when a description included in the input has less confident output based on an overall prediction confidence of the classifier. Such less-confident input samples may be referred to as the anomalous samples. If the classifier has an overall prediction confidence, the samples that are selected as the anomalous samples may be those with an output confidence below a certain threshold.

In the absence of such an overall confidence, the input may be anomalous when it includes one of the following criteria: (a) descriptions with at least one word not seen by the training data of the classifier, (b) descriptions with at least one N-gram (N-gram is either bigram or trigram) not seen by the training data of the classifier, (c) descriptions with at least one word with an occurrence frequency of less than a particular count in the training data of the classifier, (d) descriptions with phrases whose frequency was below a small threshold till a few days ago (e.g. until last month) but whose frequency has gone above a large threshold recently (e.g. since the start of the week), (e) descriptions with one or more words whose location in the description is different from what was seen in the training data descriptions.

If it is determined that the input is anomalous, then in operation 206 a query is formulated. The query is formulated based on the input, for use in obtaining third party data that is relevant to the input. In one embodiment, the input may be modified to formulate the query.

The word/phrase that meets the corresponding selection criteria mentioned above is called the anomalous phrase. The query formation step has two sub-steps. The first sub-step is to find which one of a plurality of predefined buckets the anomalous phrase belongs to. In an exemplary embodiment, there are four possible buckets: (a) merchant/organization name, (b) person name, (c) location, (d) financial term. A data-driven N-class classifier is trained for this purpose (e.g. 4-class classifier in the example above).

The training data for this classifier is generated, in one example, as follows: select 5000 distinct known phrases of each the buckets from the financial transactions we routinely enrich (e.g. 'Walmart' is a merchant name, 'ACH transfer' is a financial term and so on), and for each of these 4*5000 phrases, query the third-party sources using the phrase as the input, and normalize the corresponding top 10 most relevant documents returned from the third-party sources for the input phrase. This forms the training data. A feed-forward neural-network classifier is then trained to classify the input phrase into one of the four classes. If the confidence of this classifier is below a certain threshold, the phrase is classified as 'other'.

The second sub-step is to formulate one or more queries based on the phrase and the bucket it falls in. In an embodiment, the phrase may be inserted into a template predefined for the bucket. For example, if the phrase is in the 'merchant' bucket, the queries are 'what does <phrase> sell'/'what does <phrase> provide'/'<phrase>'. If the phrase is in the 'location' bucket, the queries are 'where is <phrase> located'/'<phrase>'. If the phrase is in the 'financial term' bucket, the query is 'what does the financial term <phrase> mean'. If the phrase is in the 'other' bucket, the query is just the '<phrase>'. Finally, if the phrase is in the 'person name' bucket, no query is formulated and the method 200 ends.

In operation 208, the third party data is obtained using the query. In other words, the query may be executed against at least one third party source to obtain data (i.e. a query result) from the third party source(s).

In operation 210, the third party data is normalized. In one embodiment, the output of the query from the third-party source is assumed to be in textual format along with certain metadata information such as (a) the uniform resource locator (URL) of the webpage on which the data is found, (b) the source of the information (in the context of Google-search or Bing-search, this could be the 'search snippet output' or the 'knowledge panel' or the actual text of the webpage), and (c) the formatting of the text in terms of the font type, style and size.

In in accordance with the embodiment above, the output may be normalized as follows:
  (a) The URL is parsed to identify just the resource name (for https://www.salespersonexample.com the resource name is salespersonexample). The resource name is then passed through a segmenter to find the individual words. One embodiment of the segmenter is a sequence-to-sequence Bidirectional Long short-term memory (BiLSTM) classifier trained on a list of 500K+ common words in the English language, where the input is the concatenation of 2 to 5 words randomly chosen from these common words and the output is the sequence of the corresponding words with a single space between the consecutive words.
  (b) The data in the 'knowledge panel' is parsed to identify the most important phrase based on the font type, style and size. The structure of the knowledge panel is also used to derive further details. For instance, the knowledge panel of a public company typically shows the latest stock price, whereas this detail is obviously missing from knowledge panels of privately held companies.
  (c) The words in the 'search snippet output' are weighed based on their font type, style and size. Words with the most unique font dimensions are given the highest weight and the weight gradually decreases as the uniqueness of the font decreases. The words/phrases obtained in such a way are then ranked and the top 5 phrases are retained as a context for the anomalous input, for example as the likely name of the primary merchant or the location.

Figure 3:
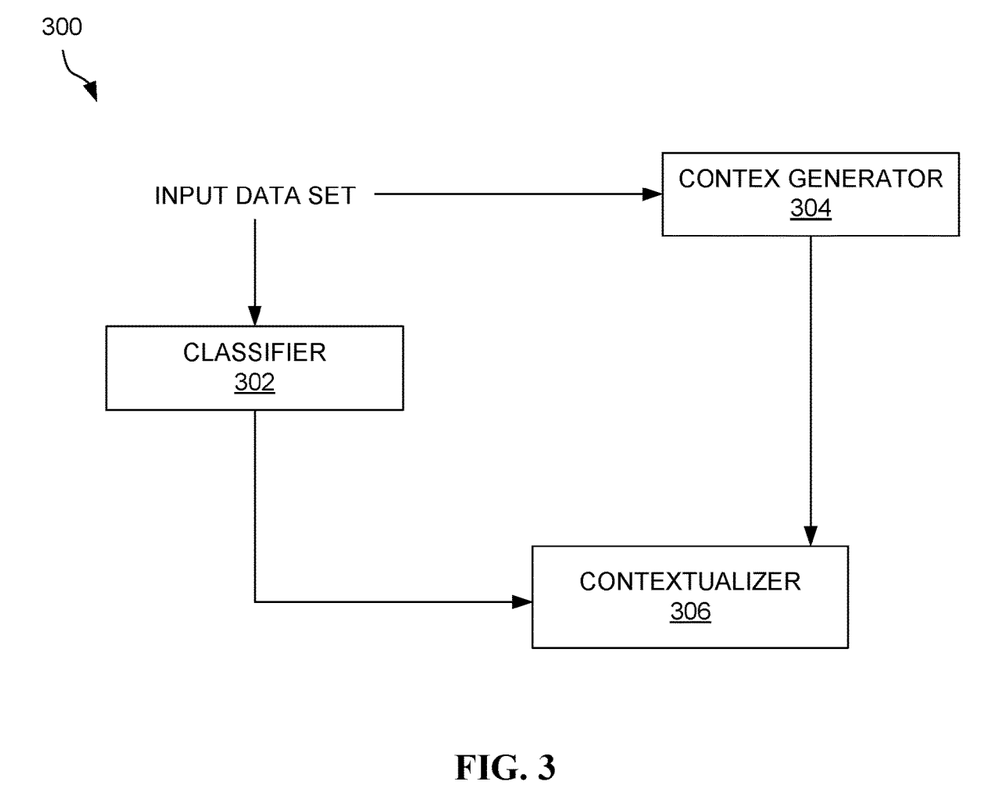
FIG. 3 illustrates a system for using third party data as a context for a classifier, in accordance with one embodiment.
Figure 4:
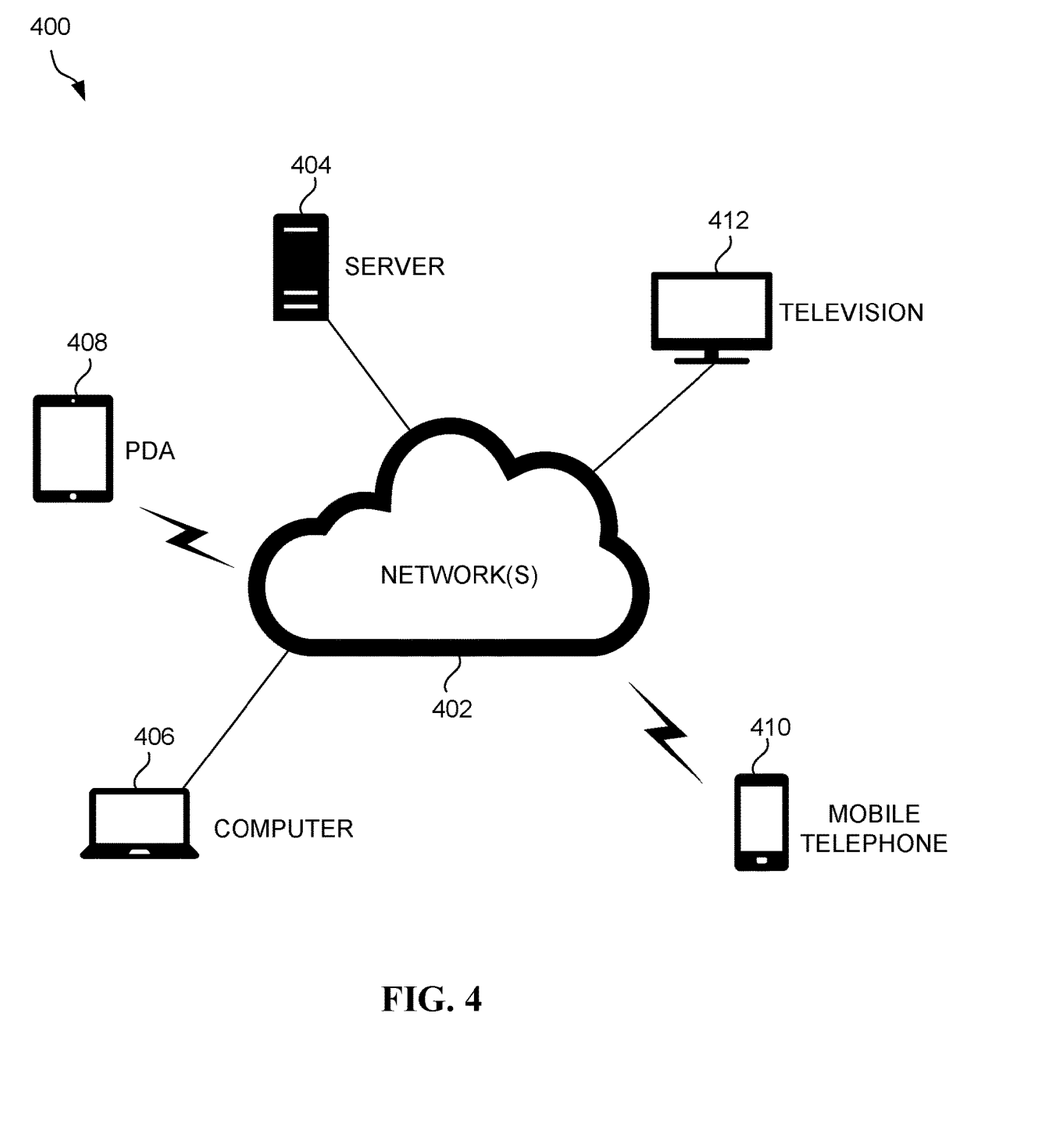
FIG. 4 illustrates a network architecture, in accordance with one possible embodiment.

FIG. 3 illustrates a system 300 for using third party data as a context for a classifier, in accordance with one embodiment. As an option, the system 300 may be implemented in the context of the details of the previous figure and/or any subsequent figure(s). Of course, however, the system 300 may be implemented in the context of any desired environment. Further, the aforementioned definitions may equally apply to the description below.

As shown, input data is provided to both a classifier 302 and a context generator 304. The classifier 302 and context generator 304 are each any combination of hardware and/or software configured to perform the functionality described herein.

The classifier 302 is configured to classify the input data into one of a plurality of predefined classifications. The context generator 304 is configured to perform the method 300 of FIG. 3 to generate a context for the input data. Output of the classifier 302, namely the classification for the input data, is provided to a contextualizer 306. Output of the context generator 304, namely the context for the input data, is also provided to the contextualizer 306.

The contextualizer 306 processes the classification for the input data and the context for the input data to determine a final classification for the input data. For example, a data-driven classifier may be used to decide how to use the output of these third-party searches in the final classification.

In one example of the contextualizer 306, assume the anomalous phrase is 'university of incarn' and that the phrase falls in the 'merchant/organization' bucket. Further assume that the merchant output from the classifier 302 is 'university of akron' and the normalized output from the third-party source is 'university of incarnate word'. The question then is: which do we accept as the final output: the output of the classifier 302 OR the output from the third-party source OR nullify both the outputs and declare no-output?

In one example, a machine learning (e.g. Random Forest) classifier may be used as the contextualizer 306 which takes features derived from: (a) the edit distance among the pairs (anomalous phrase, output of classifier 302), (anomalous phrase, output of third-party source) and (output of classifier 302, output of third-party source 304), (b) the confidence of the classifier 302, (c) the confidence of the third-party source output 304, and (d) the probability that the dollar amount spent (or earned) in the transaction is question was from the classifier's 302 output merchant versus the probability it was from the third-party-source's output merchant 304. The probabilities are learnt from all the transactions corresponding to these merchants. If the numbers of transactions for either of these two output merchants is less than 1000, we do not account for the probability-based features. Training data for the machine learning classifier was derived by having human experts provide the ground truth merchant for 10K+ samples which had 500+ unique merchants. Once the final merchant is predicted, the next task is to predict the category of the merchant. In our setup, we have 32 merchant-driven categories (some examples are: 'restaurants', 'electronics', 'travel', 'entertainment', 'groceries'). A 32-class classifier is trained using the text data obtained by searching the third-party source for 5K+ merchants we know belong to each of these 32 categories.

As a second example, consider the case where the anomalous phrase is 'treas 310' and that the phrase falls in the 'financial term' bucket. In this case, the normalized output of the third-party source 304 is not a merchant but one of the 13 non-merchant-categories that the enrichment system predicts (some examples are: 'salary', 'transfers', 'atm withdrawal', 'check deposit'). A 13-class classifier is trained using the text data obtained by searching the third-party source for 2K+ phrases we know belong to each of these 13 categories.

As an optional additional operation, once the decision about the final classification (e.g. merchant/category) is made as described in the above steps, if any of the human experts is available to validate the output, the proposed system sends the classifier 302 output, the output of the third-party-source 304, the final output of the contextualizer 306 and the actual description to the human expert who can accept the final output or update it to the correct one. Next time the classifier 302 is trained, it learns from the data that the human experts have validated. For cases where the final output is predicted with a high confidence (tunable parameter), the system 300 will accept that output without any human intervention. We refer to this as the 'self-heal' process.

Exemplary Use-Case

In one exemplary use-case, the embodiments described above may be used in the context of enriching financial transactions (but of course the embodiments can be used for similar situations, such as recognizing named entities in a tweet or a text-message; disambiguating whether a phrase implies an organization or a person's name or action in a chatbot conversation and so on).

Financial transactions are machine generated text messages which capture some of the details of a digital financial transaction between the two transacting entities. The text description of these transactions is abbreviated and often doesn't follow any universal/systematic set of rules for abbreviation. For example: a debit transaction at a Walmart store may have a description like 'ach dbt wm str xxxx1234' or a credit transaction from the US Treasury may shows up as 'us treas tx pymt' and so on. The challenge then is to find (a) the primary merchant/organization which was involved in the transaction, if any; (b) the intermediary merchant/organization which facilitated this transaction, if any; and (c) the category that the transactions belongs to (sample categories are 'restaurants', 'salary', 'credit card payment', 'insurance claim' and so on). Estimating these details from the transaction data is referred to as transaction enrichment.

The enriched data has multiple applications: (a) Aggregating the merchant, the intermediary and the category information from these financial transactions across a given user's transactions over a time duration helps to estimate the user's financial lifestyle which in turns helps to provide personalized financial service to the user, and/or (b) aggregating the enriched outputs across users of a particular financial institution or of a geographical region helps estimate global trends in the financial behavior and use that information to provide comparative benchmarking information to individual users or to a cohort of similar users.

However, the accuracy of enrichment typically deteriorates over a period of time. This happens because of two main reasons:
  (a) the composition of the text description changes over time: either the words are concatenated or a different set of characters are dropped from the words or the sequence of the words in the description is changed (e.g., 'walmart supctr' vs. 'walmartsupctr'; 'walmart supercenter' vs 'wlmrt supctr'; 'payroll wlmrt credit' vs 'credit wlmrt payroll'),
  (b) the financial ecosystem changes over time and that changed context is not relayed back to the classifier in any codified manner (e.g., 'uber' used to be a 'transportation-category' merchant, but has evolved over a period of time to provide 'ubereats' as a 'restaurant-intermediary-category'; 'ppp' had no meaning till early 2020 but now, in combination with other appropriate words, stands for 'paycheck protection program' and is indicative of a 'SMB-credit-category'). The drop in enrichment accuracy due to the second reason is far more common and far more detrimental to the overall financial analysis than that due to the first reason.

There are two common third-party sources that we can use to learn these changing financial ecosystem dynamics: (a) the outreach material published by the various financial institutions and financial reporters, and (b) the general information available on the Internet. We assume that the information from these third-party sources is available to us in the form of text information. One way to get this information in a textual format is through parsing the pdf reports or the websites of specific information providers. Another way could be to collate information from Internet search engines and rank them based on relevance to the search query. Any other approach that provides a way to search any third-party data based on a text query and returns the relevant information in a textual format to the system disclosed herein is acceptable.

The classification of the financial transaction and the context from the third-party source(s) may then be processed to determine a final classification for the financial transaction, which can then be used to enrich the financial transaction as mentioned above.

FIG. 4 illustrates a network architecture 400, in accordance with one possible embodiment. As shown, at least one network 402 is provided. In the context of the present network architecture 400, the network 402 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 402 may be provided.

Coupled to the network 402 is a plurality of devices. For example, a server computer 404 and an end user computer 406 may be coupled to the network 402 for communication purposes. Such end user computer 406 may include a desktop computer, lap-top computer, and/or any other type of logic. Still yet, various other devices may be coupled to the network 402 including a personal digital assistant (PDA) device 408, a mobile phone device 410, a television 412, etc.

Figure 5:
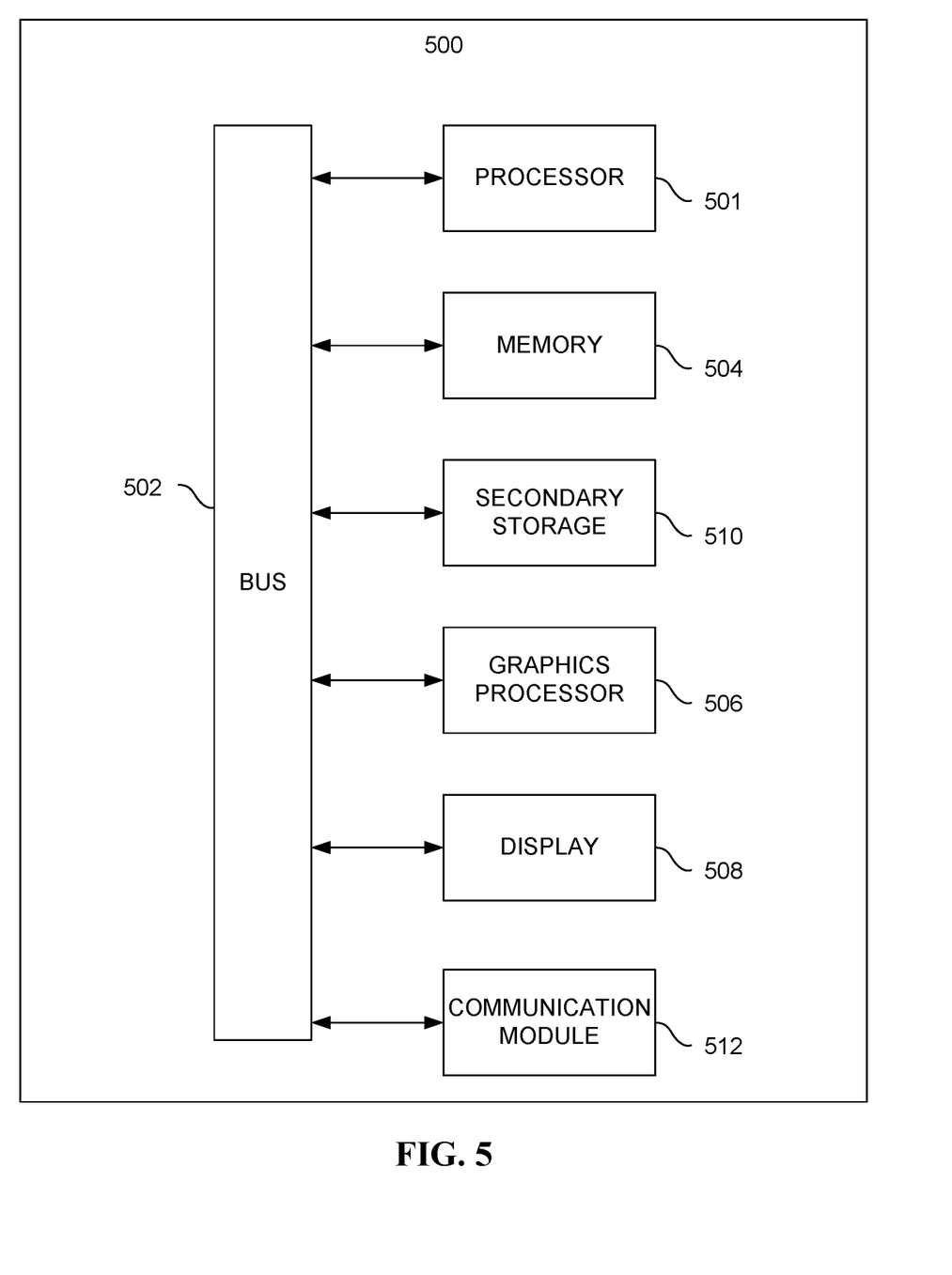
FIG. 5 illustrates an exemplary system, in accordance with one embodiment.

FIG. 5 illustrates an exemplary system 500, in accordance with one embodiment. As an option, the system 500 may be implemented in the context of any of the devices of the network architecture 400 of FIG. 4. Of course, the system 500 may be implemented in any desired environment.

As shown, a system 500 is provided including at least one central processor 501 which is connected to a communication bus 502. The system 500 also includes main memory 504 [e.g. random access memory (RAM), etc.]. The system 500 also includes a graphics processor 506 and a display 508.

The system 500 may also include a secondary storage 510. The secondary storage 510 includes, for example, solid state drive (SSD), flash memory, a removable storage drive, etc. The removable storage drive reads from and/or writes to a removable storage unit in a well-known manner.

Computer programs, or computer control logic algorithms, may be stored in the main memory 504, the secondary storage 510, and/or any other memory, for that matter. Such computer programs, when executed, enable the system 500 to perform various functions (as set forth above, for example). Memory 504, storage 510 and/or any other storage are possible examples of non-transitory computer-readable media.

The system 500 may also include one or more communication modules 512. The communication module 512 may be operable to facilitate communication between the system 500 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A non-transitory computer-readable media storing computer instructions which when executed by one or more processors of a device cause the device to:
    identify input to be processed using a classifier, wherein the input is identified from an input set based on a prediction that the input will be incorrectly classified by the classifier;
    use the input to obtain data from one or more third party data sources, wherein the data provides a context for the input;
    process the input, using the classifier, to generate output that includes at least one classification for the input;
    process the data from the one or more third party data sources together with the at least one classification generated for the input by the classifier to determine a final classification for the input.

2. The non-transitory computer-readable media of claim 1, wherein the classifier is a machine learning model that has been trained to generate an output classification for a given input.

3. The non-transitory computer-readable media of claim 1, wherein the input is predicted to be incorrectly classified by the classifier based on characteristics of the input.

4. The non-transitory computer-readable media of claim 3, wherein the classifier has an overall prediction confidence, and wherein the input which is predicted to be incorrectly classified by the classifier includes samples from the input set that each have an output confidence below a certain threshold.

5. The non-transitory computer-readable media of claim 3, wherein the input which is predicted to be incorrectly classified by the classifier includes samples from the input set that each have a description with at least one word not seen by training data used to train the classifier.

6. The non-transitory computer-readable media of claim 3, wherein the input which is predicted to be incorrectly classified by the classifier includes samples from the input set that each have a description with at least one bigram or trigram not seen by training data used to train the classifier.

7. The non-transitory computer-readable media of claim 1, wherein obtaining data from one or more third party data sources includes:
using the input to formulate a query that is usable to search the one or more third party data sources,
wherein the data is obtained as a result of the query.

8. The non-transitory computer-readable media of claim 7, wherein the query is formulated by modifying the input.

9. The non-transitory computer-readable media of claim 7, wherein the query is formulated by:
determining a portion of the input that is a cause for predicting that the input will be incorrectly classified by the classifier,
classifying the portion of the input using another classifier to generate a classification of the portion of the input, and
formulating the query by inserting the portion of the input to a template preconfigured for the classification of the portion of the input.

10. The non-transitory computer-readable media of claim 1, wherein the device is further caused to:
normalize the data obtained from the one or more third party data sources.

11. The non-transitory computer-readable media of claim 10, wherein normalizing the data includes:
processing the data to determine one or more portions of the data that provide an additional description of the input.

12. The non-transitory computer-readable media of claim 1, wherein the one or more third party data sources include at least one Internet search engine.

13. The non-transitory computer-readable media of claim 1, wherein the final classification includes a selection between:
the data from the one or more third party data sources, and
the at least one classification generated for the input by the classifier.

14. The non-transitory computer-readable media of claim 1, wherein processing both the data from the one or more third party data sources and the at least one classification generated for the input by the classifier to determine a final classification for the input includes:
processing features of the data from the one or more third party data sources and the at least one classification generated for the input by the classifier, using a second machine learning classifier, to determine the final classification for the input.

15. The non-transitory computer-readable media of claim 14, wherein the features include an edit distance between each pair of:
a portion of the input that is a cause for predicting that the input will be incorrectly classified by the classifier and the at least one classification generated for the input by the classifier,
the portion of the input and the data from the one or more third party data sources, and
the at least one classification generated for the input by the classifier and the data from the one or more third party data sources.

16. The non-transitory computer-readable media of claim 14, wherein the features include:
a confidence of the classifier, and
a confidence of the data from the one or more third party data sources.

17. A method, comprising:
at a computer system:
identifying input to be processed using a classifier, wherein the input is identified from an input set based on a prediction that the input will be incorrectly classified by the classifier;
using the input to obtain data from one or more third party data sources, wherein the data provides a context for the input;
processing the input, using the classifier, to generate output that includes at least one classification for the input;
processing the data from the one or more third party data sources together with the at least one classification generated for the input by the classifier to determine a final classification for the input.

18. A system, comprising:
a non-transitory memory storing instructions; and
one or more processors in communication with the non-transitory memory that execute the instructions to:
identify input to be processed using a classifier, wherein the input is identified from an input set based on a prediction that the input will be incorrectly classified by the classifier;
use the input to obtain data from one or more third party data sources, wherein the data provides a context for the input;
process the input, using the classifier, to generate output that includes at least one classification for the input;
process the data from the one or more third party data sources together with the at least one classification generated for the input by the classifier to determine a final classification for the input.

\* \* \* \* \*